(12) United States Patent
Ohmura

(10) Patent No.: US 7,928,385 B2
(45) Date of Patent: Apr. 19, 2011

(54) RADIATION MACHINE

(75) Inventor: Satoru Ohmura, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/556,990

(22) Filed: Sep. 10, 2009

(65) Prior Publication Data

US 2010/0059678 A1 Mar. 11, 2010

(30) Foreign Application Priority Data

Sep. 10, 2008 (JP) ................................ 2008-232322

(51) Int. Cl.
*G01T 1/00* (2006.01)
(52) U.S. Cl. .................................................... 250/336.1
(58) Field of Classification Search ............... 250/336.1, 250/370.08, 370.09
See application file for complete search history.

(56) References Cited

U.S. PATENT DOCUMENTS

| 5,811,790 A | 9/1998 | Endo |
| 2004/0188626 A1* | 9/2004 | Yamamoto ............... 250/370.09 |
| 2007/0057192 A1* | 3/2007 | Vogtmeier et al. ....... 250/370.11 |

FOREIGN PATENT DOCUMENTS

| JP | 9-288184 A | 11/1997 |
| JP | 2006-202791 A | 8/2006 |

* cited by examiner

*Primary Examiner* — David P Porta
*Assistant Examiner* — Marcus H Taningco
(74) *Attorney, Agent, or Firm* — Canon U.S.A., Inc. I.P. Division

(57) ABSTRACT

A radiation machine includes a sensor configured to convert radiation into an electric signal; an electronic component configured to process the electric signal output from the sensor; and a protector configured to protect at least a part of the electronic component from exposure to radiation, a transmittance of radiation of the protector being changeable. In the radiation machine, the transmittance of the protector, which protects an IC in the casing, is protected from exposure to radiation.

4 Claims, 5 Drawing Sheets

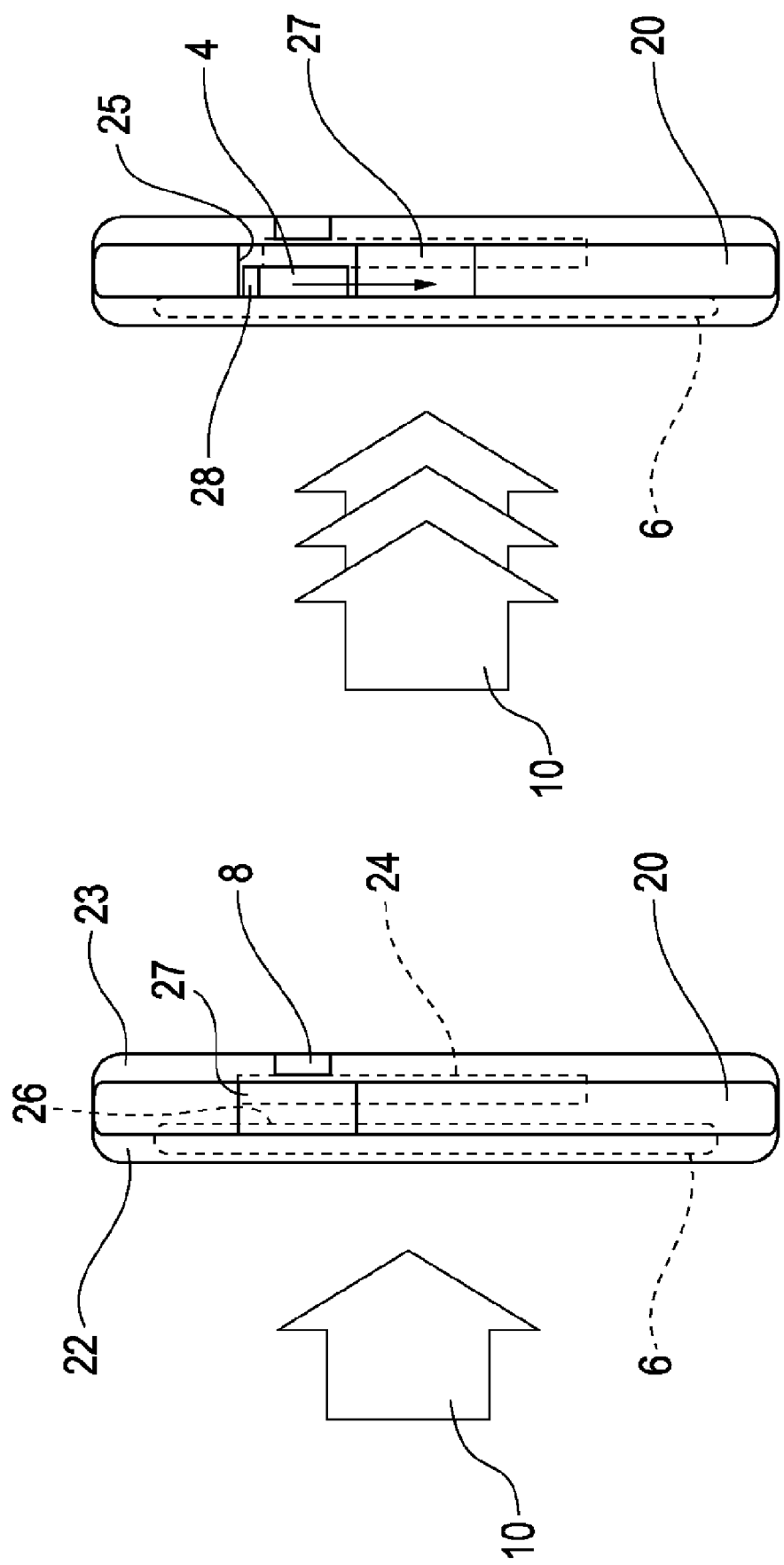

RADIATION MACHINE

BACKGROUND OF THE INVENTION

1. Field of the Invention

The present invention relates to a radiation machine which acquires a radiograph from radiation transmitted through a subject, and more particularly to a technique of protecting an electronic component from exposure to radiation.

2. Description of the Related Art

In recent years, a digital X-ray imaging apparatus using, for example, a digital radiography (DR) system in which a captured image is instantly displayed on a monitor, is widely used. For still-image capturing, the digital X-ray imaging apparatus is portable. For movie capturing, a DR system supported by a stand is developed.

When a radiation detector is used to detect radiation, an integrated circuit (IC) is necessary to process a detected signal. When an IC chip, in which an integrated circuit is formed as a chip, is exposed to radiation during driving, degradation of a transistor in the IC may be progressed, resulting in a shorter life of the IC chip as compared with a case without radiation.

Japanese Patent Laid-Open Nos. 9-288184 and 2006-202791 disclose a configuration in which a protective member for absorbing and blocking radiation is arranged for every IC to prevent the IC from being degraded.

The protective member for the IC from exposure to radiation typically uses heavy metal, such as lead, molybdenum, or wolfram. To further efficiently protect the IC from exposure to radiation, the thickness of the heavy metal in a radiation direction is increased, to decrease transmittance of radiation. The degradation of the IC is proportional to a total exposure amount of radiation. Hence, as a frame rate during movie capturing is increased, the total exposure amount of radiation is increased. As a result, a member with increased thickness and weight is necessary for protecting the IC from exposure to radiation.

However, in radiographic imaging apparatuses disclosed in Japanese Patent Laid-Open Nos. 9-288184 and 2006-202791, when a detector for both still image and movie is used, the amount of a protective member in a casing is determined regarding movie capturing with a large amount of exposure to radiation. Owing to this, the casing including the protective member which expects movie capturing has to be carried even for still-image capturing, resulting in the weight being increased, and operation performance being decreased. In addition, the life of the IC may be restricted as long as the protective member should have a portable weight. The life of a product is not sufficient. It is noted that typical movie capturing requires a protective member by an amount five times that for still-image capturing. The increased weight may be a factor of decreasing the operation performance of image capturing while being carried.

SUMMARY OF THE INVENTION

The present invention provides a radiation machine capable of protecting an IC in a casing from exposure to radiation in accordance with a capturing mode, keeping the life of the IC, decreasing the weight of the casing, and increasing operation performance.

In light of this, for example, a radiation machine according to an aspect of the present invention comprises the following arrangement. The radiation machine includes a sensor configured to convert radiation into an electric signal; an electronic component configured to process the electric signal output from the sensor; and a protector configured to protect at least a part of the electronic component from exposure to radiation, a transmittance of radiation of the protector being changeable.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is configuration diagrams showing a radiographic imaging apparatus according to a third embodiment of the invention.

DESCRIPTION OF THE EMBODIMENTS

Preferred embodiments of the present invention will be described in detail in accordance with the accompanying drawings.

First Embodiment

Figure 1:
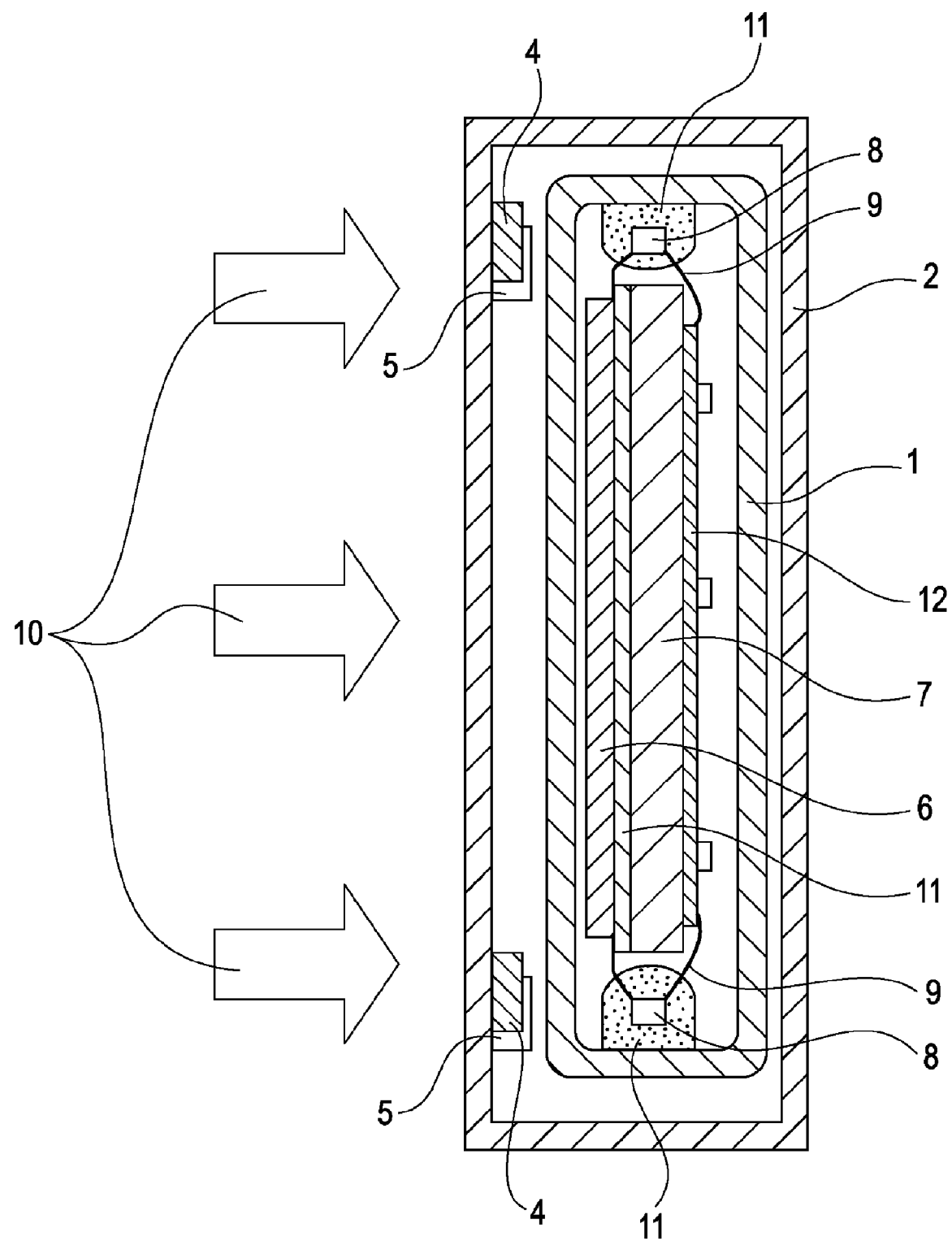
FIG. 1 is a configuration diagram showing a radiographic imaging apparatus according to a first embodiment of the invention.
Figure 2:
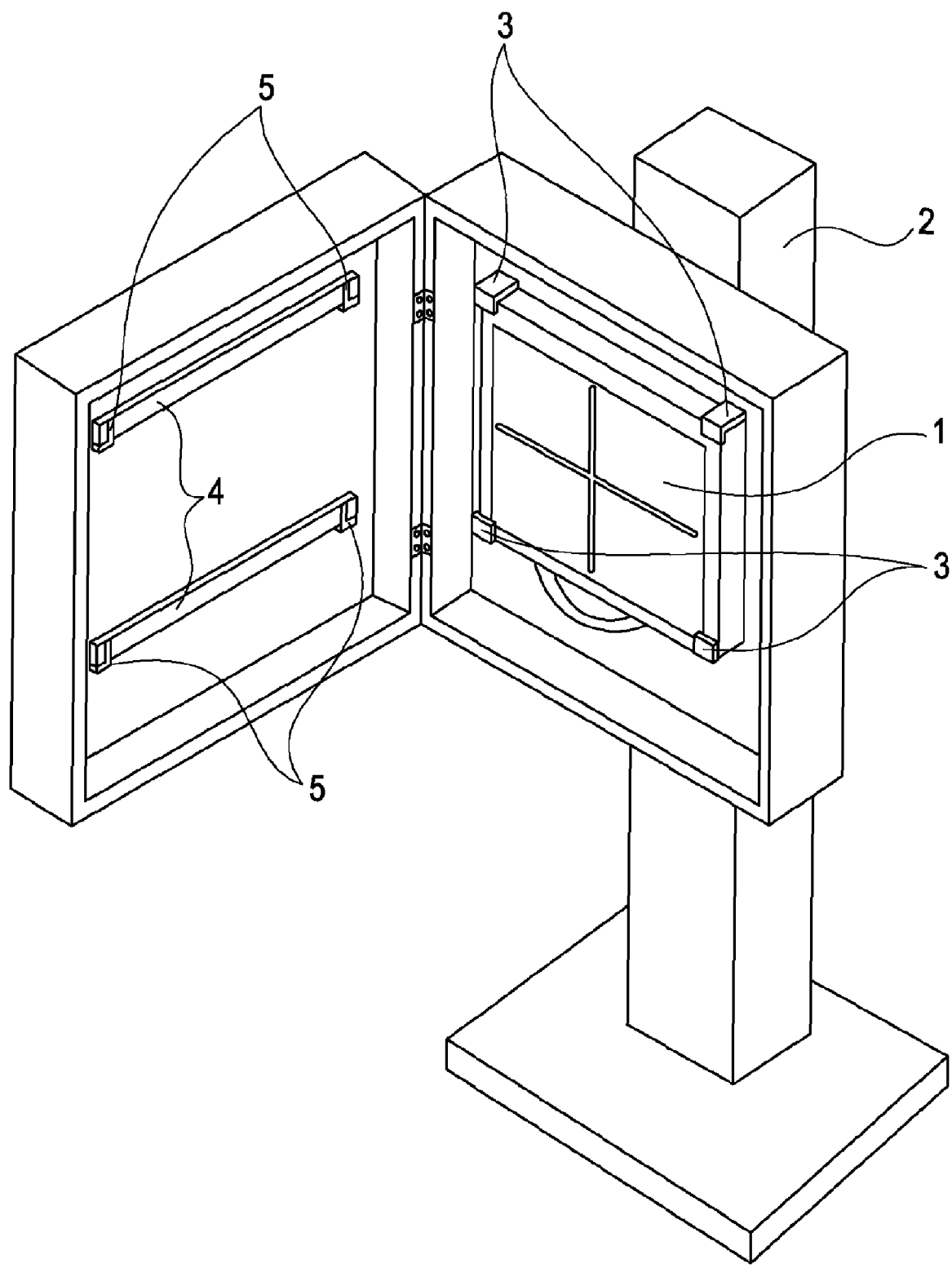
FIG. 2 is a perspective view showing the radiographic imaging apparatus supported by a stand according to the first embodiment.

FIG. 1 illustrates a configuration of a radiographic imaging apparatus according to a first embodiment of the invention. FIG. 2 is a perspective view showing the radiographic imaging apparatus according to the first embodiment. A radiation detector 6 has a sensor which detects radiation 10 radiated to a subject and converts the radiation 10 into an electric signal. An IC 8 processes the signal output from the radiation detector 6. The IC 8 is arranged outside a radiation field. An IC substrate 12 receives the signal from the IC 8 which is an electronic component.

The IC 8 is more sensitive to exposure to radiation as compared with an IC on the IC substrate 12. A cable 9 sends signals between the radiation detector 6 and the IC 8 or the IC substrate 12.

A protective member 7 also serves as a support base which supports the radiation detector 6. A protective member 11 protects the IC from exposure to radiation during still-image capturing. A casing 1 houses the radiation detector 6, the protective member 7, the IC 8 (or IC substrate 8), the cable 9, the protective member 11, and the IC substrate 12. The casing 1 is detachably attached to a stand 2. The stand 2 supports and positions the casing 1 when the casing 1 is attached to the stand 2. A fixture 3 fixes the casing 1 to the stand 2.

A protective member 4 protects at least a part of the IC 8 in the casing 1 from exposure to radiation during movie capturing. The thickness of the protective member 4 can be easily changed, and the protective member 4 is arranged at a position not affecting the radiation field.

A protective member supporter 5 supports the protective member 4. The protective member supporter 5 has a sensor which determines whether the protective member 4 is mounted. When it is determined that the protective member 4 is not mounted on the basis of the signal from the sensor, a controller (not shown) controls a radiation source device so that radiation is output at a frame rate lower than a predetermined frame rate. Since the protective member 11 is arranged in the casing 1, the protective member 11 is desirably thin with a small weight. On the other hand, the protective member 4 is included in the stand 2. Hence, the protective member 4 does not have particular restrictions for the thickness and weight. The protective member 4 can use a relatively inexpensive material different from that of the protective member 11, as long as the protective member 4 can provide protection from exposure to radiation. The material of the protective member 4 may be, for example, a steel sheet, resulting in reduction in cost.

With the above configuration, by attaching or detaching the protective member 4 (protector), radiation transmittance of radiation to the IC 8 (electronic component) is changed. During still-image capturing, the casing 1 is removed from the stand 2. The removed configuration is used as a portable radiation detector. During movie capturing, the casing 1 is mounted on the stand 2. Hence, the protective member 4 can prevent the IC 8 from exposure to radiation by a large exposure amount of movie capturing. Accordingly, a radiographic imaging apparatus can be provided, which is capable of preventing the IC from being degraded because of exposure to radiation, and which has a casing with a small weight and which does not include a protective member for the large exposure amount.

Second Embodiment

Figure 3:
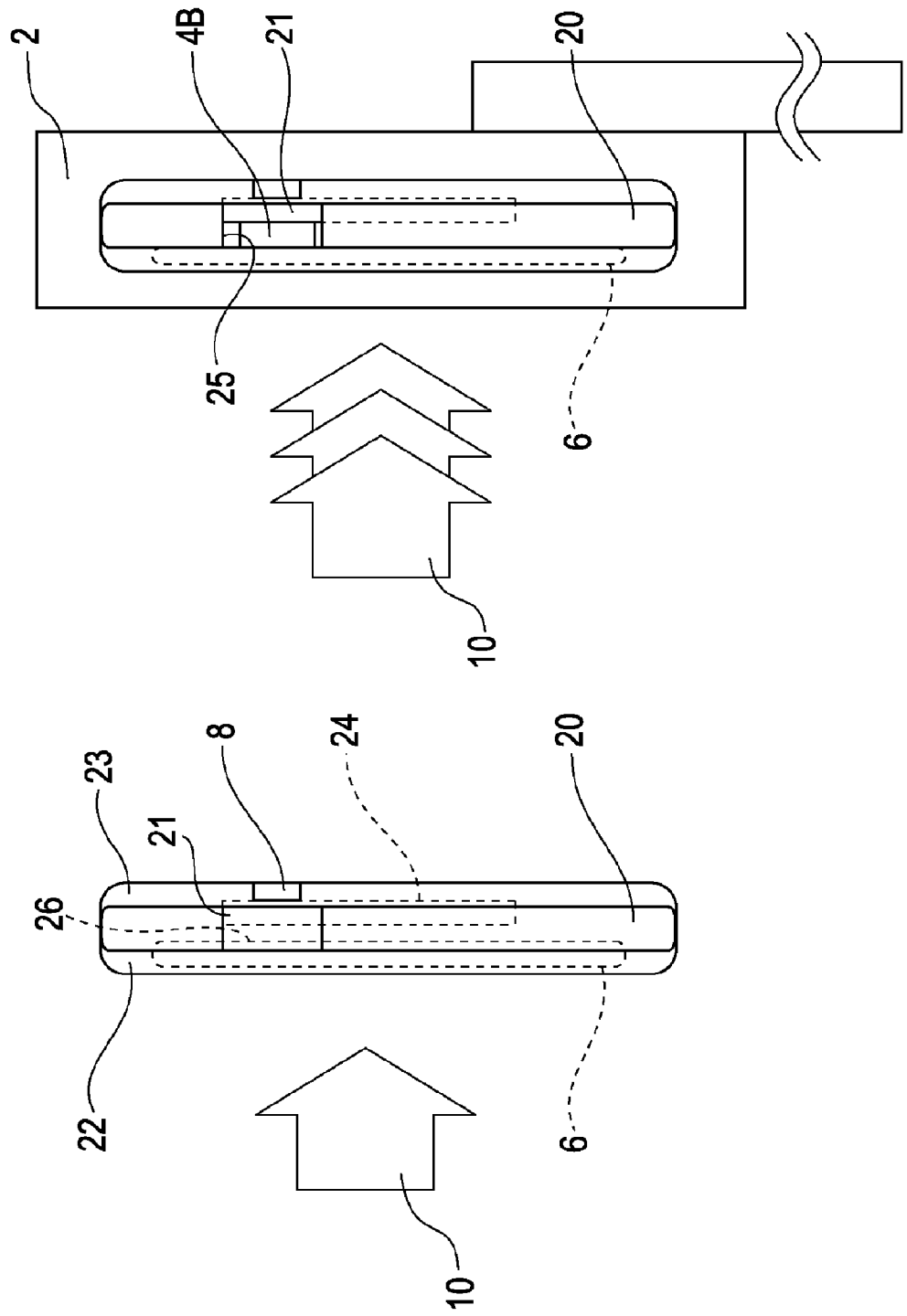
FIG. 3 is configuration diagrams showing a radiographic imaging apparatus supported by a stand according to a second embodiment of the invention.
Figure 4:
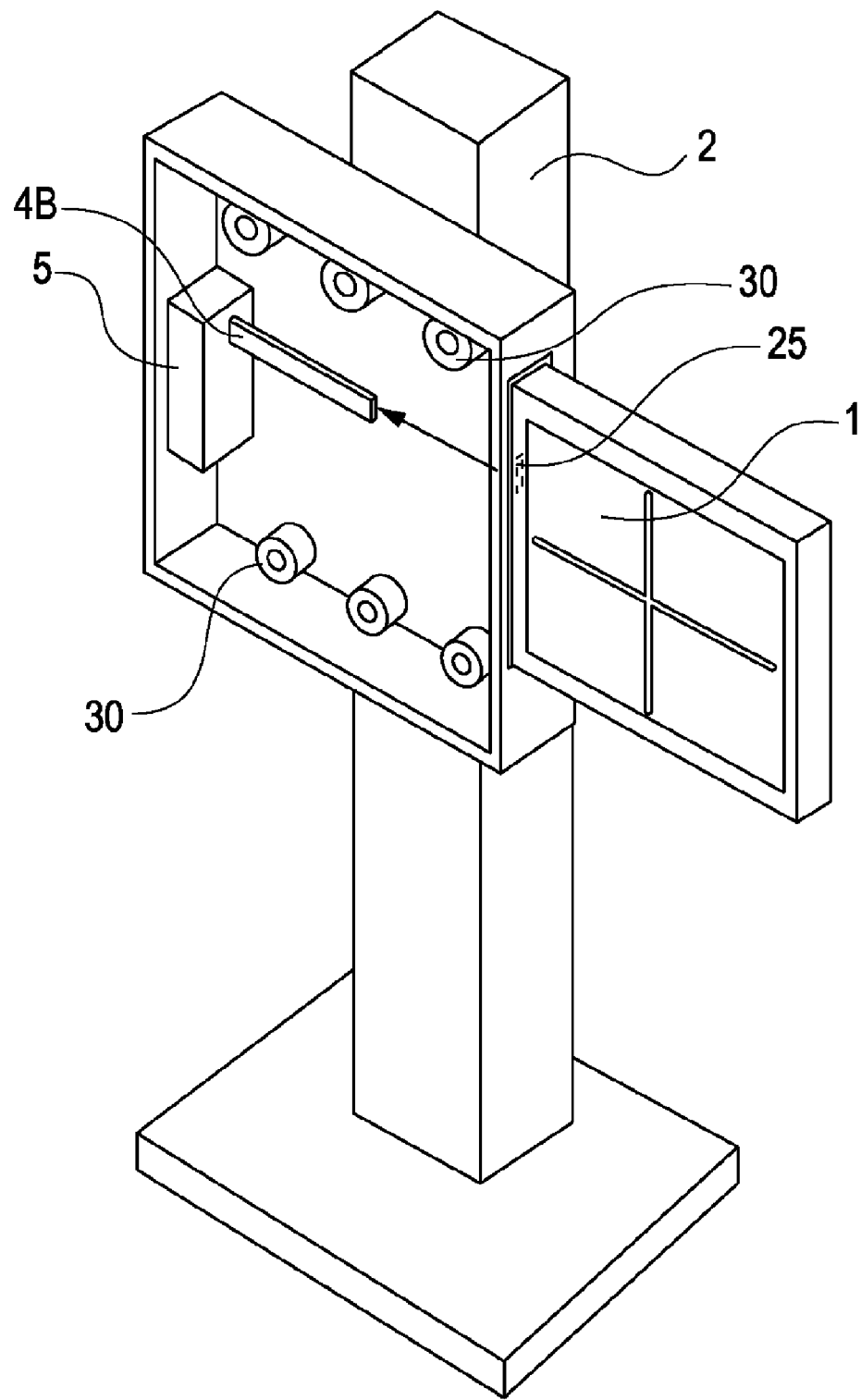
FIG. 4 is a perspective view showing the radiographic imaging apparatus inserted into the stand according to the second embodiment.

FIG. 3 illustrates a configuration of a radiographic imaging apparatus according to a second embodiment of the invention. FIG. 4 is a perspective view showing the radiographic imaging apparatus according to the second embodiment.

In the second embodiment, an IC, which requires protection from exposure to radiation during movie capturing, is arranged in a radiation field when a casing is designed to be more compact so that a distance between the subject and the radiation detector 6 is decreased.

In FIGS. 3 and 4, a hole 25 is made in a side surface of a casing. A protective member 4B is inserted or removed through the hole 25. In this embodiment, the casing is defined by a front cover 22, a rear cover 23, and a side cover 20 of the casing. A side cover 21 of the casing is a movable cover to close the hole 25. The side cover 21 has a hinge at one side, thereby being openable and closable. An electric substrate 24 has an IC 8. A gap 26 is formed, through which the protective member 4 between the radiation detector 6 and the electric substrate 24 in the casing is inserted or removed. The gap 26 communicates with the hole 25. The protective member 4 is provided in the stand 2. Referring to FIG. 4, the casing 1 is mounted on the stand 2 in a sliding manner while the casing 1 is guided by rollers 30. Then, the protective member 4 is inserted through the gap 26. The casing 1 is positioned when contacting the protective member supporter 5. The electric substrate 24 and the radiation detector 6 are arranged in a space separated from the gap 26 and the hole 25. Thus, light-shielding performance and dustproof performance are kept.

With the configuration, since the protective member 4 is arranged in the gap 26, the IC 8 is protected from exposure to radiation during movie capturing. Accordingly, even the IC arranged within the radiation field can be prevented from being degraded because of exposure to radiation. A difference in dimension between an imaging region and an external dimension can be decreased. As a result, a radiographic imaging apparatus can be provided, which is capable of performing alignment during image capturing by decreasing the distance between the subject and the radiation detector 6.

Third Embodiment

FIG. 5 illustrates a configuration of a radiographic imaging apparatus according to a third embodiment of the invention.

In the third embodiment, a casing has a unit configured to change a transmittance of radiation of a protective member. Accordingly, when a protective member required for movie capturing is not provided in the casing, by providing a function for inhibiting movie capturing in the casing, excessive exposure of the IC 8 to radiation can be prevented.

In FIG. 5, a slide cover 27 closes or opens the hole 25 along the side cover 20. A sensor 28 detects whether a protective member 4 is mounted. When the sensor 28 recognizes that the protective member 4 is mounted, exposure to radiation at a predetermined frame rate or higher is permitted.

With the configuration, for movie capturing, the slide cover 27 is opened, and the protective member 4 is inserted into the hole 25. Accordingly, the sensor 28 permits movie capturing, and protects the IC 8 from exposure to radiation during movie capturing. Accordingly, a radiographic imaging apparatus can be provided in which the casing can prevent the IC 8 from being deteriorated because of exposure to radiation, and the life of the IC 8 is stable.

The frame rate can be restricted by combining the first and second embodiments.

As described above, since the transmittance of radiation of the protective member can be changed, operation performance is increased when the configuration is used as a portable device, and protection performance of the electronic component can be increased during movie capturing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-232322 filed Sep. 10, 2008, which is hereby incorporated by reference herein in its entirety.

What is claimed is:

1. A radiation machine comprising:
   a sensor configured to convert radiation into an electric signal;
   an electronic component configured to process the electric signal output from the sensor;
   a protector configured to protect at least a part of the electronic component from exposure to radiation, a transmittance of radiation of the protector being changeable;
   a detector configured to detect whether the transmittance of radiation of the protector is changed; and
   a controller configured to inhibit a radiation source, which outputs the radiation, from outputting the radiation at a predetermined frame rate or higher on the basis of the detected result.

2. A radiation machine comprising:
   a sensor configured to convert radiation into an electric signal;

an electronic component configured to process the electric signal output from the sensor;

a protector configured to protect at least a part of the electronic component from exposure to radiation, a transmittance of radiation of the protector being changeable;

a casing configured to house the sensor and the electronic component, wherein at least a hole is formed in a side surface of the casing, the transmittance of radiation of the protector being changed by inserting or removing a protective member through the hole;

a stand configured to support the casing in an attachable and detachable manner, wherein the transmittance of radiation of the protector is changed by inserting or removing the protective member by the stand.

3. The radiation machine according to claim 2, wherein, for the protector, a thickness of the protective member is changed.

4. The radiation machine according to claim 2, wherein, for the protector, a material of the protective member is changed.

* * * * *